(12) United States Patent
Eah et al.

(10) Patent No.: US 7,251,040 B2
(45) Date of Patent: Jul. 31, 2007

(54) SINGLE METAL NANOPARTICLE SCATTERING INTERFEROMETER

(75) Inventors: Sang-Kee Eah, Darien, IL (US); Xiao-Min Lin, Naperville, IL (US); Gary Wiederrecht, Elmhurst, IL (US)

(73) Assignee: UChicago Argonne LLC, Chicago, IL (US)

( * ) Notice: Subject to any disclaimer, the term of this patent is extended or adjusted under 35 U.S.C. 154(b) by 266 days.

(21) Appl. No.: 11/040,914

(22) Filed: Jan. 21, 2005

(65) Prior Publication Data

US 2006/0164654 A1 Jul. 27, 2006

(51) Int. Cl.
*G01B 11/02* (2006.01)

(52) U.S. Cl. ............ 356/498

(58) Field of Classification Search ........ 356/451, 356/477, 482, 496, 498
See application file for complete search history.

(56) References Cited

U.S. PATENT DOCUMENTS

| | | | | |
|---|---|---|---|---|
| 5,072,110 A * | 12/1991 | Lu et al. | ........ | 250/227.14 |
| 5,231,464 A * | 7/1993 | Ichimura et al. | ........ | 356/477 |
| 5,359,415 A * | 10/1994 | Tabarelli | ........ | 356/482 |
| 5,486,919 A * | 1/1996 | Tsuji et al. | ........ | 356/484 |
| 5,867,268 A * | 2/1999 | Gelikonov et al. | ........ | 356/477 |
| 7,057,732 B2 * | 6/2006 | Jorgenson et al. | ........ | 356/445 |
| 2003/0039428 A1 * | 2/2003 | Okamoto et al. | ........ | 385/12 |

FOREIGN PATENT DOCUMENTS

JP 02143139 A * 6/1990

OTHER PUBLICATIONS

Quantitative Analysis of surface plasmon interaction with silver nanoparticles☐☐Andrey L. Stepanov et al, Optics letters, vol. 30, No. 12, Jun. 15, 2005.*

* cited by examiner

*Primary Examiner*—Tarifur Chowdhury
*Assistant Examiner*—Jonathon D Cook
(74) *Attorney, Agent, or Firm*—Joan Pennington

(57) ABSTRACT

An interferometer and a method for generating scattered light interference are provided. A beam splitter is provided by a single metal nanoparticle to split an incoming excitation light. Scattered light from the single metal nanoparticle and its mirror image shows interference in both spatial and spectral domains. A mirror modifies the spatial distribution of elastic light scattering of the single metal nanoparticle. A large spectral width of the scattered light enables a distance measurement without scanning the mirror.

18 Claims, 5 Drawing Sheets

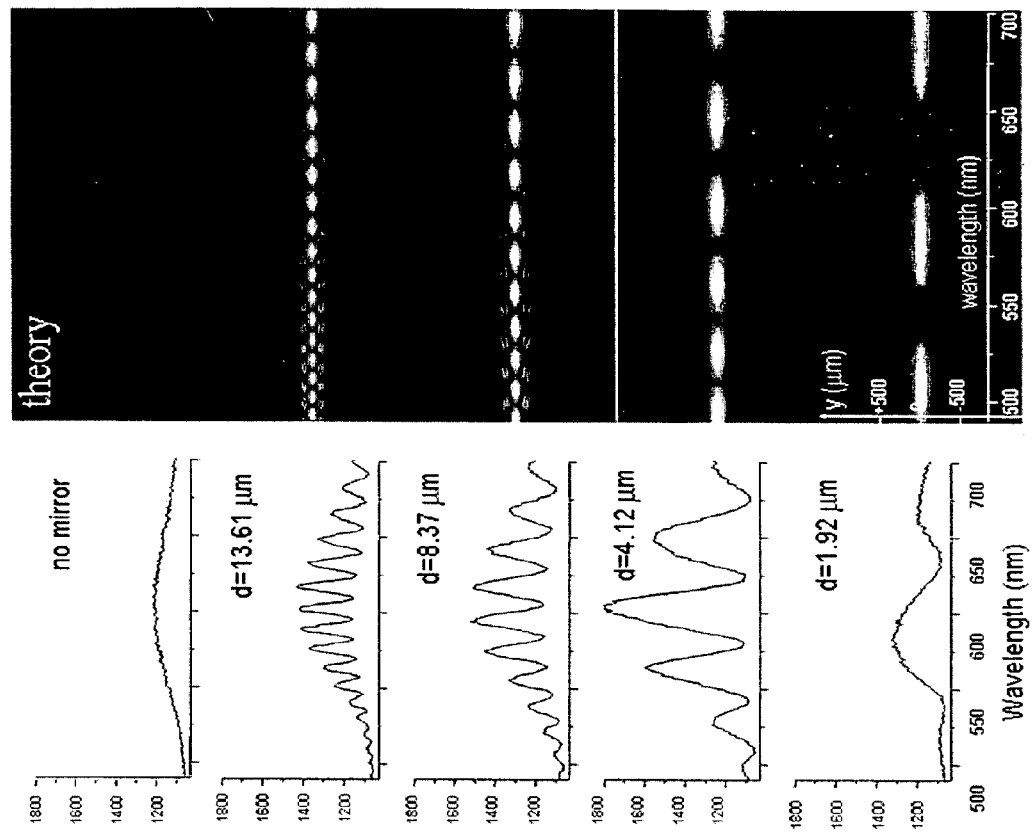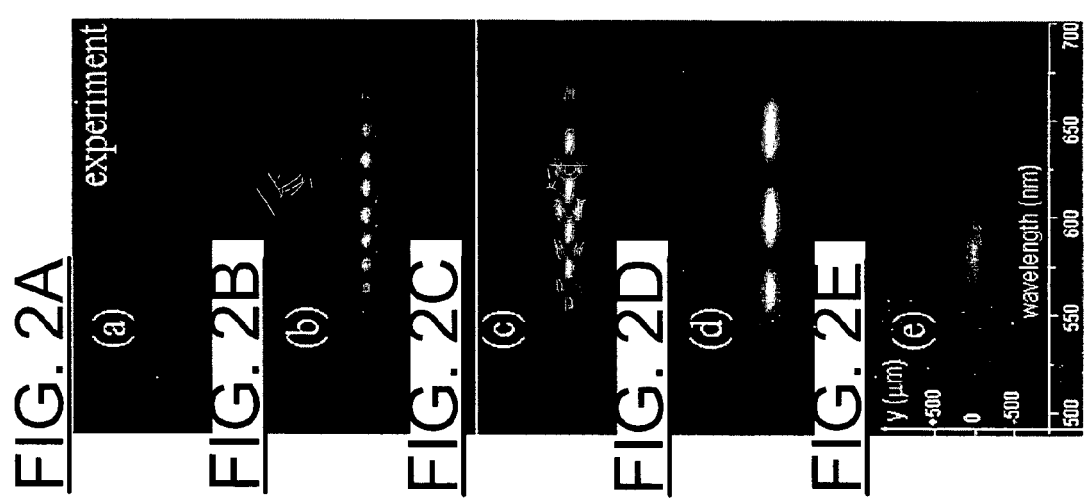
FIG. 2A  FIG. 2B  FIG. 2C  FIG. 2D  FIG. 2E

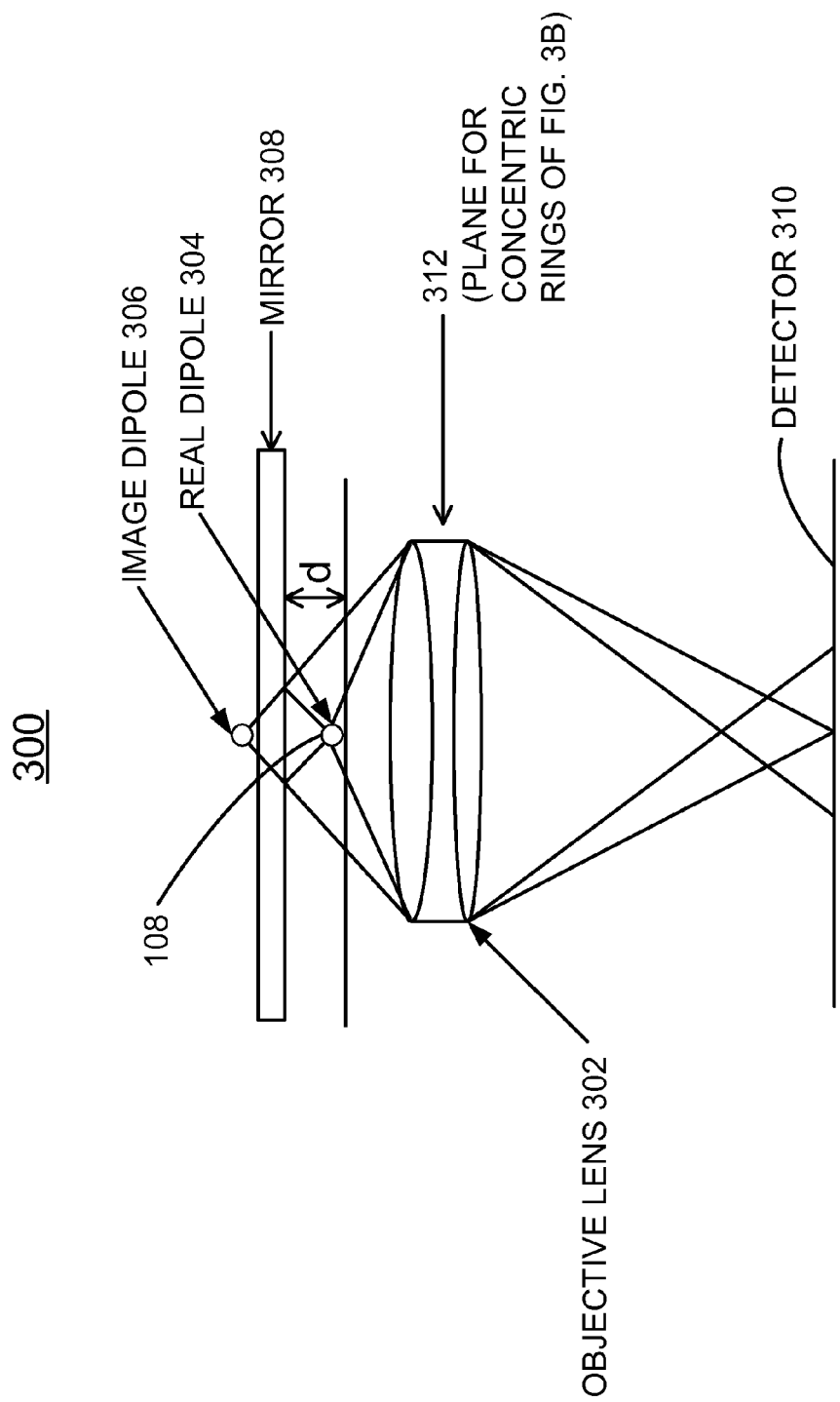

US 7,251,040 B2

SINGLE METAL NANOPARTICLE SCATTERING INTERFEROMETER

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to the field of interferometer design, and more particularly to a new design for an interferometer using a single metal nanoparticle as a beam splitter.

DESCRIPTION OF THE RELATED ART

Interferometry relates to the coming together of waves, in this case, light waves, in the same place. When two coherent waves come together at the same time and place, interference occurs. Interference can be visualized as the adding of two waves with each other. Depending on the degree to which they are in or out of step or phase with each other, they will either increase or decrease the amplitude of the wave. Interferometry is the use of the interference phenomena for measurement purposes; either for very small angles or for distance increments, such as the displacement of two objects relative to one another.

An interferometer is an instrument that employs the interference of light waves for purposes of measurement. Conventionally an interferometer consists of a beam of light, a beam splitter mirror that reflects the beam onto two or more flat mirrors. The beams are then combined or overlapped so as to interfere with each other forming alternating bands of light and dark known as fringes. Fringes are bright where the beams are constructively added together and dark where they are canceling each other out.

A value of interferometry is that the fringe spacing and shifts in the fringe position make it possible to learn about light/matter interactions through phase shifting of light interacting with a material, or to determine the difference in length traveled by the two beams in different paths. This scheme is adopted in a traditional Michelson interferometer, which is widely used in many applications, such as dynamic alignment to overcome vibrations in many sensitive instruments.

Metal nanoparticles, particularly silver and gold, are of interest as sensors, particularly as biosensors, because their optical properties change dramatically in response to their local environment. This can enable detection of molecular adsorbates at very low concentration and the possibility of the detection of single molecules with high sensitivity.

A principal object of the present invention is to provide a new design for an interferometer using a single metal nanoparticle as a beam splitter.

SUMMARY OF THE INVENTION

In brief, an interferometer and a method for generating scattered light interference are provided. A beam splitter is provided by a single metal nanoparticle to split an incoming excitation light. Scattered light from the single metal nanoparticle and its mirror image shows interference in both spatial and spectral domains. A mirror modifies the spatial distribution of the scattered light of the single metal nanoparticle. A large spectral width of the scattered light enables a distance measurement without scanning the mirror.

In accordance with features of the invention, part of the light scattered from the nanoparticle travels directly towards a detector, while a portion is scattered towards the mirror defined by an Al coated optical fiber located above the nanoparticle. This light is reflected back by a surface of the Al coated optical fiber toward the detector to provide a second beam. The beams are focused through an objective lens and a mirror onto, for example, a liquid nitrogen cooled CCD imaging spectrometer.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2A, 2B, 2C, 2D, and 2E illustrate exemplary operation of the interferometer apparatus in accordance with the invention together with corresponding theoretical simulation results for various particle to mirror distances;

FIG. 3A is a schematic diagram illustrating exemplary operation of interferometer apparatus in accordance with the invention with the objective lens focused to a real dipole of the single gold nanoparticle, and the image dipole by the metal mirror defocused at the detector;

DETAILED DESCRIPTION OF THE PREFERRED EMBODIMENTS

Figure 1:
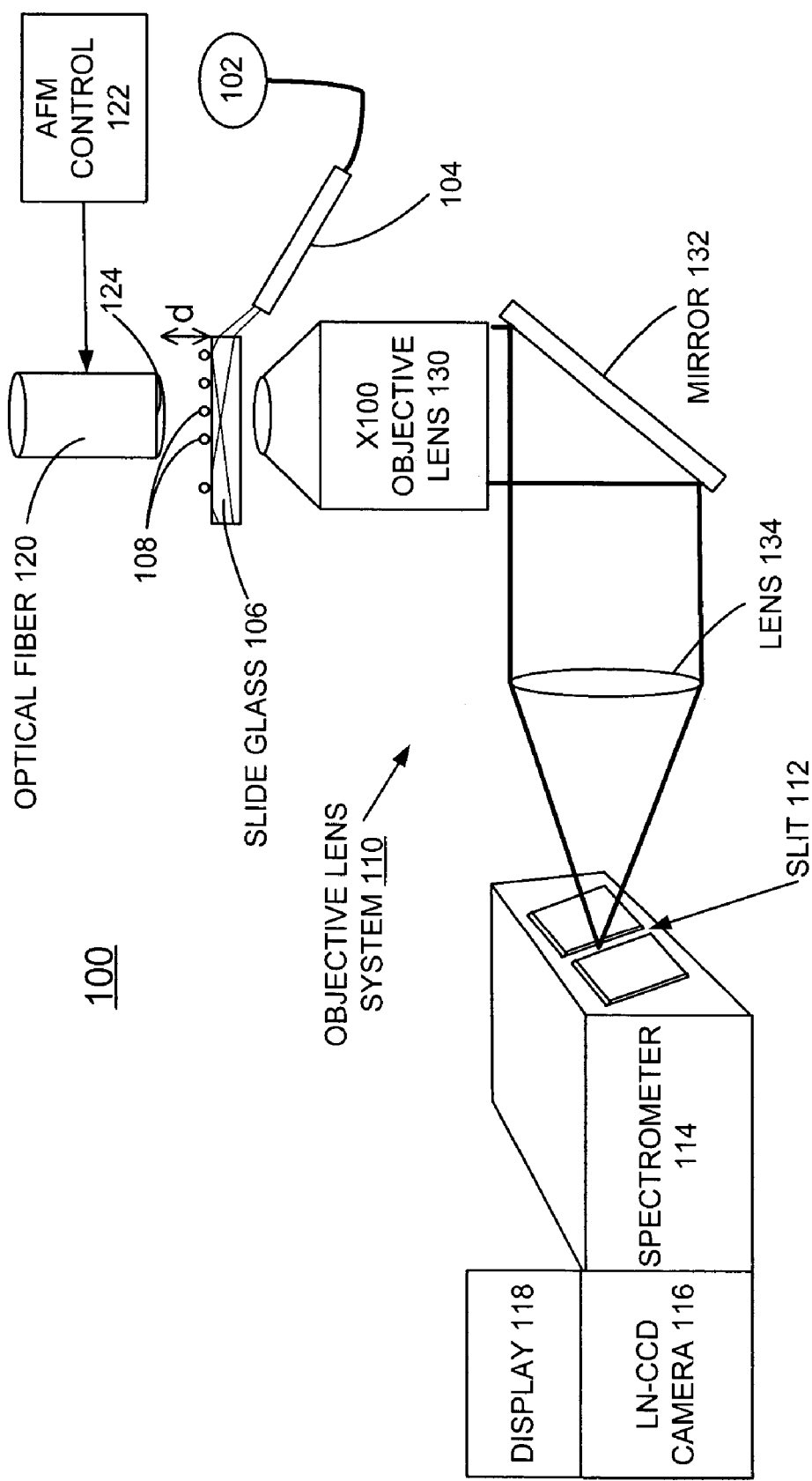
FIG. 1 is a schematic diagram illustrating exemplary interferometer apparatus in accordance with the invention.

Spontaneous light emission from many quantum systems is caused by single electron transitions between discrete energy levels. Changing the photonic mode density near a light emitter by placing it near a mirror or inside a cavity modifies the spatial distribution, decay rate, and resonance frequency of the light emission. Experimentally, such effects have been observed in an ensemble of molecules deposited on a metal mirror, atoms traversing between two mirrors, single trapped electron, and semiconducting quantum dots in an optical cavity. These modifications are the essence of cavity quantum electrodynamics (QED), and have thus attracted great research interests during the past several decades.

Light emission can also be generated by scattering from a small particle, a quasi-elastic process that originates from the collective oscillation of free electrons inside the particle. For gold and silver nanoparticles, this collective oscillation generates a plasmon resonance in the visible region with a Lorentzian line shape. Field enhancement induced by the surface plasmon is responsible for the enhanced Raman signals of molecules near the nanoparticle surface. Coherent surface plasmon propagation along coupled nanoparticles has been proposed as an efficient way to transport energy on a small length scale. It is therefore crucial to understand the effect of local environment on the surface plasmon. Existing experiments have focused on the effect of local dielectric environments on the resonance frequency.

The spatial redistribution of scattered light in the presence of other interface or scatterer has not been thoroughly investigated, but could have a much more significant implication in nanoscale photonics. The main obstacle is the short dephasing time, for example, less than 10 fs, and large linewidth of the plasmon tend to create complex field distribution that are entangled with both the spatial and spectral contributions.

In accordance with features of the invention, metal nanoparticles and interferometry are combined in a unique way so that interferometry can be implemented with a single nanoparticle with simplified equipment, and generally in a much smaller space. Unlike the traditional interferometer that uses a macroscopic beam splitter, a single metal nanocrystal or nanoparticle is used to split the incoming excitation light. The broad spectrum of metal surface plasmon scattering and the use of a monochromator enables interference in both spatial and spectral domains. This scheme requires no moving mirror to perform distance measurements as with conventional interferometers. An important advantage of the interferometer apparatus in accordance with the invention is the elimination of the need for a moving mirror, which is required by conventional interferometers In accordance with features of the invention, by adopting a novel dark field imaging technique, a unique interference pattern in both spatial and spectral domains is obtained between the direct scattered light from a single gold nanoparticle and the indirect scattered light from its mirror image. The large linewidth of the surface plasmon enables the determination of the absolute vertical distance between the particle and the nearby metal surface, for example, with a ten nanometer resolution. The nonintrusive interferometry method of the invention enables non-invasive position determination with resolution typical of invasive scanning probe microscopy methods. Using this scheme of the invention, the ability to observe the interference effect is not limited by the dephasing time of the surface plasmon, but instead by the spectral resolution of the spectrometer and the degree of defocusing of the reflected light from the detector. Theoretical simulations based on scalar wave diffraction theory reproduce all the features of the experiments, which shows the light scattered into different directions by a single nanoparticle are spatially coherent.

Having reference now to the drawings, in FIG. 1 there is shown an exemplary interferometer apparatus generally designated by reference character 100 in accordance with the invention. Interferometer apparatus 100 includes a light source 102, such as a halogen lamp. White light from the halogen lamp 102 is fed through an optical fiber 104, such as a multimode optical fiber, and coupled into a thin glass slide 106.

Scattered light from a gold nanoparticle 108 is collected by an objective lens system generally designated by reference character 110 and fed through a narrow entrance slit 112 into a spectrometer 114 that is coupled with a two dimensional liquid nitrogen cooled charge-coupled device (LN-CCD) camera 116 providing a display 118.

An optical fiber 120, such as a chemically etched optical fiber coated with aluminum, is controlled by an AFM controller 122. The optical fiber 120 is used as a micron size mirror with an optical fiber surface face 124 functioning as a light reflecting mirror.

Objective lens system 110 includes an objective lens 130, such as a ×100 objective lens positioned below the glass slide 106 that carries the beam splitter nanoparticle 108. Objective lens 130 collects the scattered light directly from the beam splitter nanoparticle 108 and reflected by optical fiber mirror 120. A mirror 132 couples the collected light from the objective lens 130 via a second lens 134, such as a focusing lens, to the entrance slit 112 of the spectrometer 114.

Interference between the light from the real dipole and the image dipole causes a redistribution of light in space. Such a modification can be clearly seen in FIG. 3B, where the light intensity distribution on a cross sectional plane after the objective lens is depicted. A more straight forward revelation on how the interference pattern is generated is shown in FIG. 3C, where the intensity distribution on the detector 310 from the real dipole and image dipole are shown separately before being superimposed. The real dipole field has a tight focus spot on the detector 310, and its size has a slight wavelength dependence. On the other hand, the image dipole is defocused, with many self-interference rings. This field distribution from a defocused dipole can be independently verified without using a mirror. The interference pattern extends far away from the center, even though in this area the light intensity from the real dipole is relatively small. The high visibility of the interference is caused by the relative phase shift of the two dipole fields.

As shown in FIG. 1, the gold nanoparticles 108 are sparsely arrayed on the slide glass 106. Incoming excitation light from the halogen lamp 102, is directed through optical fiber 104 to the slide glass 106 at the nanoparticle 108. Rather than splitting the light beam through a conventional beam splitter, the single nanoparticle 108 essentially provides the beam splitter function. This is achieved because part of the light scattered from the nanoparticle 108 travels directly towards the detector objective lens 130, while a portion is scattered towards the Al coated optical fiber 120 located above the nanoparticle. This light is reflected by the Al coated optical fiber mirror surface 124 back towards the detector objective lens 130 to provide the second beam. The beams are focused through the objective lens 130, mirror 132 and lens 134 onto the narrow entrance slit 112 of the liquid nitrogen cooled CCD imaging spectrometer 114, 116.

Advantages of the invention over more conventional interferometers include: the active component such as beam splitter 108 in this configuration is on nanometer scale, much smaller than the macroscopic beam splitter adopted in the traditional design. The interferometer device 100 has no moving mirror components, since the distance can be deduced by the interference patterns in spatial and spectral domains. The invention interferometer device 100 has been reduced to practice and experimental results are provided by the inventors as illustrated and described with respect to FIGS. 2A, 2B, 2C, 2D, and 2E; FIGS. 3A, 3B, 3C and FIG. 4. Ultimately, this could be applied to other single particle materials besides metals, such as technologically important semiconductor particles and perhaps even to single molecules. The simplified interferometer may enable new compact and rugged sensors, as well as interferometers that are more easily incorporated into lab-on-a-chip environments due to a minimization of moving parts and small size.

Gold nanoparticles with an average diameter of 80 nm were synthesized in an aqueous solution by citric acid reduction of gold salt. The gold nanoparticles were subsequently deposited on the surface of a 1 mm thick microslide glass at a sufficiently low density, so that the average interparticle distance is larger than 20 μm. This allows isolated nanoparticles to be studied individually by the far field optical techniques without the interference of the nearby particles. Unlike the traditional dark field imaging techniques, we invented a different scheme that frees up the space both below and above the sample. This allows simultaneous sample manipulation by atomic force microscopy (AFM) and optical detection in the far field with a large solid angle.

An experimental setup of the interferometer device 100 shown in FIG. 1 has been used to provide experimental results. White light from halogen lamp 102 was coupled into a multimode optical fiber 104 having a 105 µm core diameter, and directed to the side of the microslide 106. The evanescent wave created by the total internal reflection at the glass-air interface excites the nanoparticle 108. Only the scattered light from the gold nanoparticle 108 propagates to the far-field, and is collected by a long working distance (6 mm) 100× magnification objective lens 130 with a numerical aperture (NA) of 0.7 and an effective focal length of 2 mm. A 100 µm entrance slit 112 was used to select a narrow strip of interference pattern in real space, shown as the y direction in FIGS. 2A, 2B, 2C, 2D, and 2E and dispersed with the imaging spectrometer into different wavelengths, shown as the x-direction in FIGS. 2A, 2B, 2C, 2D, and 2E. The optical signal was collected by a two dimensional liquid nitrogen cooled charge-coupled device (LN-CCD) camera 116 with an integration time of 10 seconds. A single mode optical fiber 120 was chemically etched, and its flat end surface 124 was coated with a thin film of aluminum to form a flat micron size mirror of 125 µm diameter. With a tuning fork attached, the distance between the mirror surface 124 and glass surface 106 can be controlled by an AFM controller.

Without the mirror 124, the surface plasmon scattering from a single spherical gold nanoparticle 108 has a Lorentzian line shape, whereas an aggregate or a nonspherical particle typically has a nonsymmetric line shape. This trend was verified by combining optical spectroscopy measurements with scanning electron microscopy on the same sample, and used as a criteria for selecting an isolated spherical nanoparticle for the experiments. Nonspherical particles can also be resolved from the asymmetrical spatial distribution of scattered light, which can be obtained by slightly defocusing the image at the detector and allowing the signal to be collected on a larger area on the detector.

FIGS. 2A, 2B, 2C, 2D, and 2E illustrate exemplary operation of the interferometer apparatus in accordance with the invention together with corresponding theoretical simulation results for various particle to mirror distances. Plasmon scattering light interference patterns of a single gold nanoparticle 108 near a metal mirror 120 are illustrated at several distances. The y-axis represents the vertical slice of the spatial light distribution, which is dispersed into different wavelengths (x-axis). Experimental results are shown in the left column. The intensity profile along the wavelength at y=0 is shown in the center column. The corresponding theoretical simulation results are shown in the right column with various particle to mirror distances.

FIG. 2A shows the scattering spectrum from a particle that has a spectral width of 68 THz, corresponding to a dephasing time of 2.4 fs. We did not control the excitation light polarization using the multimode optical fiber. However, due to the spatial distribution of the dipole field and the experimental set up, the majority of the scattered light collected by the objective lens comes from the dipole oscillation that is parallel to the glass surface.

With the mirror approaching from far field, a unique interference pattern develops along both the spectral axis (x-direction) and the spatial axis (y-direction). The left column of FIGS. 2A, 2B, 2C, 2D, and 2E show the experimental data at several different mirror-particle distances. Surprisingly, even with the mirror-particle separation at two orders of magnitude larger than the wavelength of the light, the interference pattern can still be clearly resolved. This interference phenomenon can be understood by the superposition of the light scattered directly from the nanocrystal and the indirectly scattered light reflected from the mirror. The light intensity at the center of the detector (y=0) oscillates along the wavelength as seen in the central column in FIGS. 2A, 2B, 2C, 2D, and 2E. The period becomes longer as we decrease the mirror-particle distance or increase the wavelength. Similar to Young's double-slits experiment, the interference happens at a single photon level. We observed no interference patterns when the CCD integration time is set at 0.1 second. But the superposition of many such images creates the interference.

To reproduce the complex interference pattern by numerical simulations, especially the Y-shape features near y=0 in FIGS. 2B, 2C, 2D, and 2E, we consider the propagation of both the directly scattered light and indirectly scattered light by the mirror reflection through the lens system. In our simulation, the directly scattered light was approximated using the field created by a dipole that is parallel to the glass surface. It ultimately focuses on a detector 310, as illustrated and described with respect to FIG. 3A. The reflected light from mirror 308 in FIG. 3A is approximated by an image dipole that is defocused from the detector. Different in plane orientation of the dipole was averaged to match the condition in our experiment. The propagation of the light through the lens system with a finite numerical aperture is calculated using the scalar wave diffraction theory based on Huygens-Fresnel principle. For instance, the complex field amplitude at the detector is a superposition of spherical waves from oscillators on the spherical plane of the tube lens, can be represented by:

$$U(\vec{r}') = \frac{f^2}{i\lambda} \int\int d\Omega (U_r(\vec{r}) + U_i(\vec{r})) \frac{\exp\left(i\frac{2\pi}{\lambda}s\right)}{s}$$

where f is the focal length of the tube lens, the Ur and Ui terms represent complex field amplitudes at the tube lens induced by the real dipole and the image dipole respectively, and s represents the distance between the tube lens integration point and the detector position. The integration solid angle is determined by the numerical aperture of the tube lens. In a similar fashion, the complex field on the tube lens including complex field Ur and Ui terms was calculated from the complex field distribution on the spherical plane of the objective lens. The extra path lengths caused by the 1 mm thick microslide glass was also taken in account. The radii of the spherical planes are focal lengths, such as 2 mm for the objective lens and 248 mm for the tube by experimentally obtained magnification 124.

Simulation results shown in the right column of FIGS. 2A, 2B, 2C, 2D, and 2E reproduce all the major features we observed in the experiment, with an exception that the spectral envelop of the surface plasmon was not taken into account in the simulation. Interference between the light from the real dipole and the image dipole causes a redistribution of light in space. Such a modification can be clearly seen in FIG. 3B, where the light intensity distribution on a cross sectional plane after the objective lens 302 is illustrated.

Referring now to FIG. 3A, there is shown an exemplary interferometer apparatus generally designated by reference character 300 in accordance with the invention with an objective lens 302 focused to a real dipole indicated by 304 of the single gold nanoparticle 108, and an image dipole indicated by 306 by a metal mirror 308 defocused at a detector 310. A cross-sectional plane after the objective lens 302 is indicated by reference character 312.

Figure 3B:
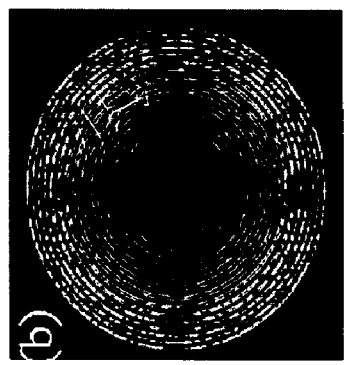
FIGS. 3B and 3C are images respectively illustrating theoretical simulation results of the interference between the two dipoles of FIG. 3A at the mirror distance d=13.12 μm and wavelength λ=600 nm.
Figure 3C:
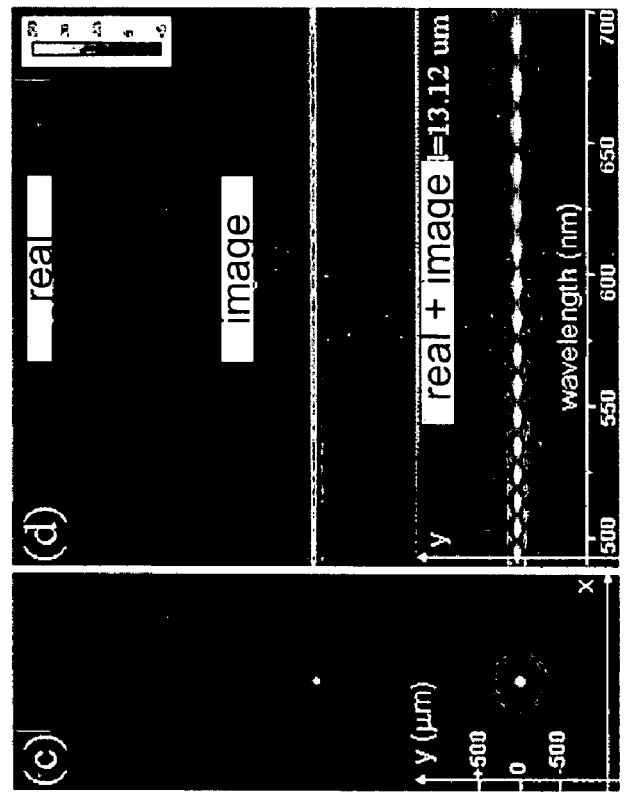

Referring also to FIGS. 3B and 3C, there are shown images respectively illustrating theoretical simulation results of the interference between the two dipoles of FIG. 3A at the mirror distance d=13.12 µm and wavelength λ=600 nm of simple concentric rings at a plane 312 after the objective lens 302 in FIG. 3B. At the left in FIG. 3C spatial light distributions at the detector show complex concentric rings for both image only and real+image. At the right in FIG. 3C spreads of the y-axis slices along the wavelength show just inclined straight lines for image only, and the unique interference pattern for real+image.

Interference between the light from the real dipole and the image dipole causes a redistribution of light in space. Such a modification can be clearly seen in FIG. 3B, where the light intensity distribution on a cross sectional plane after the objective lens is depicted. A more straight forward revelation on how the interference pattern is generated is shown in FIG. 3B, where the intensity distribution on the detector 310 from the real dipole and image dipole are shown separately before being superimposed. The real dipole field has a tight focus spot on the detector 310, and its size has a slight wavelength dependence. On the other hand, the image dipole is defocused, with many self-interference rings. This field distribution from a defocused dipole can be independently verified without using a mirror. The interference pattern extends far away from the center, even though in this area the light intensity from the real dipole is relatively small. The high visibility of the interference is caused by the relative phase shift of the two dipole fields.

Scattering from a metal nanoparticle typically has a large spectral width. This creates a complex interference pattern in both the spatial and the spectral domains. By analyzing this pattern, we can determine the distance between the nanoparticle and the mirror surface. If we consider only the light travelling along the optical axis, the relative phase shift along the wavelength between two consecutive destructive interference ($\lambda 1$ and $\lambda 2$) is $2\pi$. The absolute distance (d) between the nanoparticle and the mirror can be estimated by $d=(|\lambda 1-\lambda 2|)/2\lambda 1\lambda 2$. To determine the distance precisely, we can compare the simulation with the experimental data, which taken into account all the light collected by the objective lens.

Figure 4:
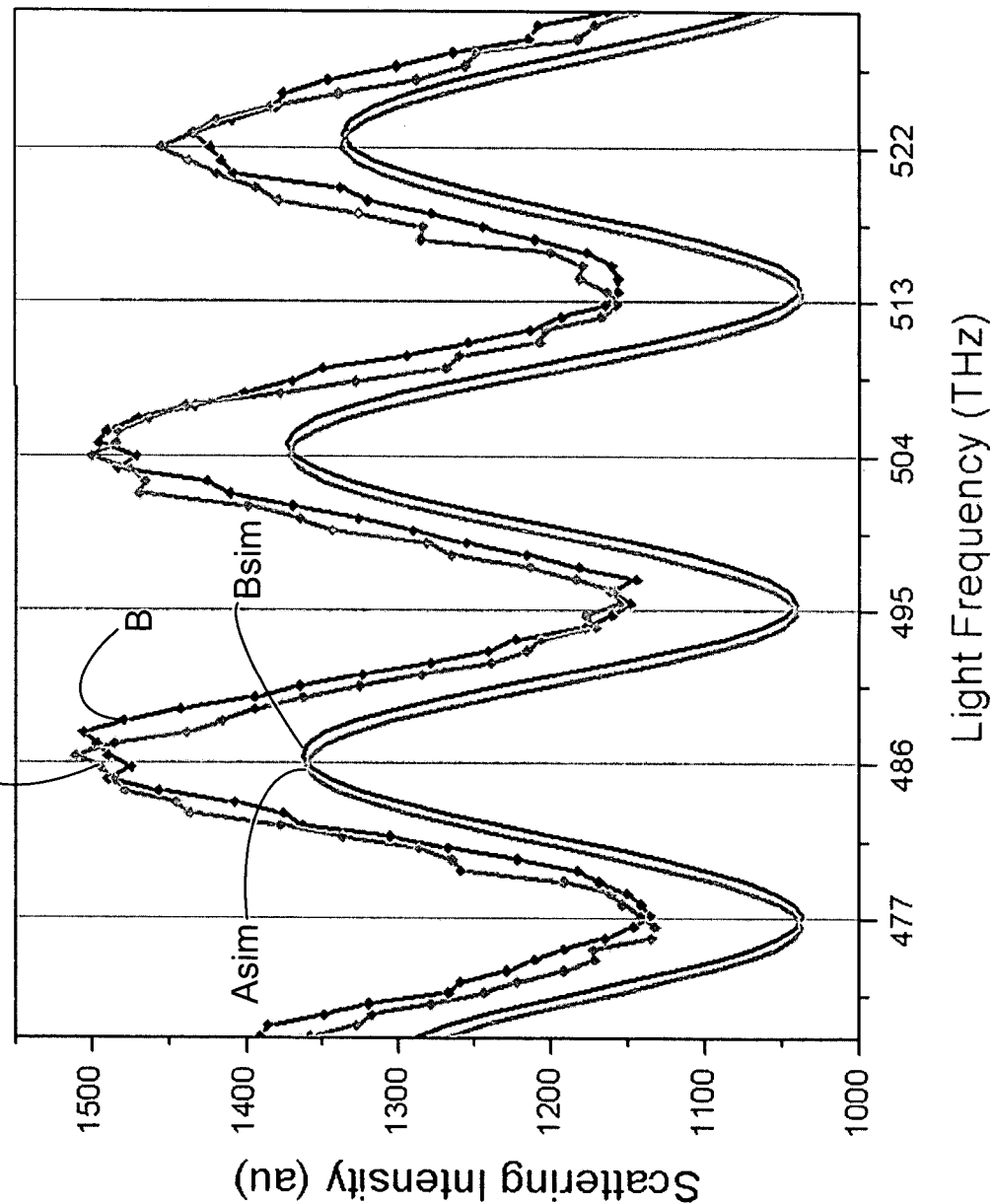
FIG. 4 is a chart illustrating experimental data at different particle mirror distances and corresponding simulation results.

FIG. 4 shows the intensity distribution at two particle-mirror distances for both the experiment of the preferred embodiment and a simulation. FIG. 4 shows that the particle-mirror distance can be determined, for example, with a spatial resolution of 10 nm, based on the shift of interference patterns. Two top curves labeled A and B corresponds to the experimental data at particle mirror distance of 8350 nm and 8360 nm. The bottom two curves labeled Asim and Bsim illustrate the corresponding simulation results. It is clear that a resolution of 10 nm can be readily resolved with the experimental apparatus 100. A maximum distance that can be determined by this technique is limited by the spectral resolution of the spectrometer 114 and the decrease of the visibility due to the defocusing of the image dipole. In our case, it is about d=33 µm with the spectrometer resolution of 0.86 nm. The smallest distance that can be determined is about 1.5 µm, which is limited by the spectral width of the single nanoparticle plasmon.

In principle, the presence of a mirror not only alters the spatial distribution of scattered light, but also modifies the radiative decay rate of the light emitter. Probing this phenomenon would require designing new experiments to integrate scattered light intensity of all solid angles. The high visibility of the interference even with a large mirror particle separation allows nanometer resolution distance measurements from far field in a large distance range. This nonintrusive interferometry technique could be useful in studying many biological systems where application of scanning probe microscopy could be detrimental. Furthermore, compared with light emitters that based on fluorescence, surface plasmon scattering does not suffer from problems such as spectral diffusion and stochastic blinking.

While the present invention has been described with reference to the details of the embodiments of the invention shown in the drawing, these details are not intended to limit the scope of the invention as claimed in the appended claims.

What is claimed is:

1. An interferometer comprising:
a beam splitter defined by a single metal nanoparticle to split an incoming excitation light and generate scattered light; said single metal nanoparticle being deposited on a surface of a glass slide;
a mirror spaced apart from said single metal nanoparticle for modifying a spatial distribution of said scattered light from the single metal nanoparticle to generate a mirror image; said scattered light from the single metal nanoparticle and the mirror image showing interference in both spatial and spectral domains; and
a detector for detecting said scattered light from the single metal nanoparticle and the mirror image and utilizing a spectral width of said scattered light and the mirror image for measuring a distance between the single metal nanoparticle and the mirror without scanning the mirror.

2. An interferometer as recited in claim 1 wherein said single metal nanoparticle includes a gold nanoparticle.

3. An interferometer as recited in claim 1 wherein said single metal nanoparticle includes a silver nanoparticle.

4. An interferometer as recited in claim 1 wherein said mirror includes an optical fiber.

5. An interferometer as recited in claim 1 wherein said mirror includes an aluminum coated optical fiber.

6. An interferometer as recited in claim 1 wherein said incoming excitation light includes a white light coupled to a glass slide carrying said single metal nanoparticle.

7. An interferometer as recited in claim 6 wherein said white light is provided by a halogen lamp; said white light coupled by a multimode optical fiber to the glass slide.

8. An interferometer as recited in claim 1 wherein said detector for detecting said scattered light from the single metal nanoparticle and the mirror image includes an objective lens for collecting said scattered light.

9. An interferometer as recited in claim 1 wherein said detector includes a spectrometer having an entrance slit for receiving said scattered light collected by an objective lens.

10. An interferometer as recited in claim 1 wherein said detector includes a spectrometer having an entrance slit for receiving said scattered light collected by an objective lens and coupled by a mirror to said entrance slit.

11. An interferometer as recited in claim 10 includes a second focusing lens disposed between said mirror and said entrance slit.

12. An interferometer as recited in claim 1 wherein said detector includes a liquid nitrogen cooled charge-coupled-device (CCD) imaging spectrometer.

13. An interferometer as recited in claim 1 wherein said distance is measured between said single metal nanoparticle and said mirror utilizing an interference pattern in both spatial and spectral domains.

14. A method for generating scattered light interference comprising the steps of:

defining a beam splitter by a single metal nanoparticle to split an incoming excitation light and generate scattered light; said single metal nanoparticle deposited on a surface of a glass slide;

providing a mirror spaced from said single metal nonoparticle for modifying a spatial distribution of said scattered light from the single metal nanoparticle to generate a mirror image; said scattered light from the single metal nanoparticle and the mirror image showing interference in both spatial and spectral domains;

detecting said scattered light from the single metal nanoparticle and the mirror image; and utilizing a spectral width of said scattered light and the mirror image for measuring a distance between the single metal nanoparticle and the mirror without scanning the mirror.

15. A method for generating scattered light interference as recited in claim 14 wherein said detecting step includes obtaining interference patterns in both spatial and spectral domains.

16. A method for generating scattered light interference as recited in claim 14 wherein said detecting step includes providing objective lens for collecting said scattered light from the single metal nanoparticle and the mirror image.

17. A method for generating scattered light interference as recited in claim 16 wherein said detecting step includes providing a spectrometer having an entrance slit for receiving collected scattered light from said objective lens.

18. A method for generating scattered light interference as recited in claim 16 wherein said detecting step includes providing liquid nitrogen cooled charge-coupled-device (CCD) imaging spectrometer having an entrance slit for receiving collected scattered light from said objective lens.

* * * * *